United States Patent
Lee et al.

(10) Patent No.: US 7,792,076 B2
(45) Date of Patent: Sep. 7, 2010

(54) METHOD AND DEVICE FOR AUTOMATICALLY ALLOCATING CHANNELS OF WIRELESS NETWORK SYSTEM

(75) Inventors: Shih Ching Lee, Taipei (TW); Pei Chuan Liu, Taipei (TW)

(73) Assignee: Cameo Communications Inc. (TW)

( * ) Notice: Subject to any disclaimer, the term of this patent is extended or adjusted under 35 U.S.C. 154(b) by 655 days.

(21) Appl. No.: 11/798,321

(22) Filed: May 11, 2007

(65) Prior Publication Data

US 2008/0130573 A1 Jun. 5, 2008

(30) Foreign Application Priority Data

Dec. 1, 2006 (TW) ............................... 95144586 A

(51) Int. Cl.
*H04W 4/00* (2009.01)
(52) U.S. Cl. ...................... 370/329; 455/450; 455/509; 455/515
(58) Field of Classification Search ................. 455/426, 455/450, 509, 515; 370/333, 329
See application file for complete search history.

(56) References Cited

U.S. PATENT DOCUMENTS

| | | | |
|---|---|---|---|
| 6,985,465 B2* | 1/2006 | Cervello et al. | 370/333 |
| 7,206,840 B2* | 4/2007 | Choi et al. | 709/225 |
| 7,596,461 B2* | 9/2009 | Hart et al. | 702/69 |
| 2002/0055359 A1* | 5/2002 | Andersson et al. | 455/426 |
| 2002/0188723 A1 | 12/2002 | Choi et al. | |
| 2006/0014506 A1 | 1/2006 | Haartsen | |

FOREIGN PATENT DOCUMENTS

CN 1462523 12/2003

* cited by examiner

*Primary Examiner*—Lester Kincaid
*Assistant Examiner*—Isaak R Jama

(57) ABSTRACT

A method for automatically allocating channels of a wireless network system comprises the steps of: actuating one of access points (APs) for collecting channel status information, such as channel numerals and Received Signal Strength Incident (RSSI), of the other of the access points near by that access point; calculating an accumulated RSSI value of each of the access points according to the collected channel numerals and the RSSI value via a Network Management Server (NMS); calculating the accumulated RSSI value of each of the access points by weighting to obtain a weighted RSSI value thereof; and switching an operation channel of the actuated access point into the better channel having a relatively lower weighted RSSI value for improving the overall efficiency of the wireless network system. Furthermore, the method for automatically allocating channels can be used to periodically monitor the channel status of the channel corresponding to each of the access points, so as to actively fine-adjust the channel of that access point or to change a monitor period.

9 Claims, 6 Drawing Sheets

| Channel numeral | RSSI | MAC address |
|---|---|---|
| 11 | 17 | 00:15:e9:72:37:91 |
| 10 | 16 | 00:0f:b5:ae:c9:e2 |
| 11 | 8 | 00:22:55:77:88:cc |
| 3 | 22 | 00:13:46:c2:46:16 |

FIG. 4

| Channel numeral | Accumulated_RSSI |
|---|---|
| 11 | 25 |
| 10 | 16 |
| 3 | 22 |

FIG. 5

| Channel numeral | Weighted_RSSI |
|---|---|
| 1 | 4*0+2*0+22 |
| 2 | 4*0+2*22+0=44 |
| 3 | 4*22+2*0+0=88 |
| 4 | 4*0+2*22+0=44 |
| 5 | 4*0+2*0+22=22 |
| 6 | 0 |
| 7 | 0 |
| 8 | 16 |
| 9 | 16*2+25=57 |
| 10 | 4*16+2*25=114 |
| 11 | 4*25+2*16=132 |

FIG. 6

METHOD AND DEVICE FOR AUTOMATICALLY ALLOCATING CHANNELS OF WIRELESS NETWORK SYSTEM

BACKGROUND OF INVENTION

1. Field of the Invention

The present invention relates to a method and a device for automatically allocating channels of a wireless network system, and more particularly to a method and a device provided with an access point (AP) for collecting channel status information of other access points (APs) in a wireless network system followed by calculating which one channel is the better channel via a Network Management Server (NMS) for controlling said access point to use the better channel for the purpose of automatically allocating channels of the wireless network system.

2. Description of the Prior Art

Presently, due to human life having more and more needs to the portability of electronic information apparatus and the real-time transmission of electronic information, various wireless communication functions have become one of requisites when a consumer wants to buy an electronic information apparatus.

Traditionally, a communication system of Wireless Local Access Network (WLAN) is provided to integrate radio frequency (RF) technologies with network technologies, so that users not only can access Internet information without using any physical network cables, but also the users can access the Internet information by connecting other network devices via the WLAN. Even though the communication system of the WLAN can be used to provide the accessing convenience, it still exist a disadvantage that the communication system thereof is not provided with any physical network cables to connect each of Access Points (APs) which provide transmission services of wireless information with each of terminal devices of the users. Thus, it is an important issue for related manufacturers to think how to stably control and allocate communication channels between each of the APs and each of the terminal devices for lowering the interference with each other and improving the overall efficiency of the communication system of the WLAN.

Nowadays, two conventional methods for allocating communication channels of a plurality of access points (APs) within a common WLAN are used. One of the conventional methods is to manually set a corresponding operation channel for each of the APs in turn by a network administrator, and the other thereof is to automatically set a corresponding operation channel for each of the APs via a built-in program of each of the APs. Apparently, the conventional method of manually setting the operation channel is a relatively uneconomical management, and it is difficult for the network administrator to be on call 24 hours and continuously adjust the corresponding operation channel for each of the APs in the network according to the variation of operation status on different times. In another aspect, although the conventional method of automatically setting the operation channel by each of the APs may increase the management convenience, it still exists other disadvantages. For examples, because each of the APs respectively allocates a corresponding channel in an independent manner, it is difficult for the network administrator to adjust or control rules or conditions for allocating channels of an entire WLAN, i.e. it only can provide limited operation flexibility, and can not be used to optimize the channel allocations. Furthermore, when the operation status of the network varies (for example, one of the APs or one of channels suddenly receives excess data transmission requests, or the amount of the APs suddenly increases or decreases), the conventional method still can not immediately and actively adjust nor re-allocate the operation channel of each of the APs, so that the overall efficiency of the communication system of WLAN can not be remarkably improved.

It is therefore tried by the inventor to develop a method and a device for automatically allocating channels of a wireless network system to solve the problems existing in the conventional methods for allocating communication channels as described above.

SUMMARY OF INVENTION

A primary object of the present invention is to provide a method and a device for automatically allocating channels of a wireless network system, which is used to control and automatically adjust an operation channel of each of access points (APs) via a Network Management Server (NMS) for enhancing and improving the overall efficiency of a communication system of Wireless Local Access Network (WLAN).

A secondary object of the present invention is to provide a method for automatically allocating channels of a wireless network system, which is provided with an access point (AP) for collecting channel status information of other access points (APs) followed by calculating which one channel is the better channel according to the channel status information, so that the better channel can be allocated to said access point for the purpose of enhancing and improving the overall efficiency of a communication system of WLAN.

A third object of the present invention is to provide a method for automatically allocating channels of a wireless network system, which is used to periodically monitor a channel status corresponding to a operation channel of each of APs, when the current operation channel of one of the APs has an accumulated Received Signal Strength Incident (RSSI) greater than a predetermined threshold limit value, actively performing a method for automatically allocating channels for re-allocating another channel with a lower load to said AP.

In order to achieve the aforementioned objects, the present invention discloses a method for automatically allocating channels of a wireless network system comprising the steps of: actuating one of access points (APs) for collecting channel status information, such as channel numerals and Received Signal Strength Incident (RSSI), of the other of the access points near by that access point; calculating an accumulated RSSI value of each of the access points according to the collected channel numerals and the RSSI value via a Network Management Server (NMS); calculating the accumulated RSSI value of each of the access points by weighting to obtain a weighted RSSI value thereof; and switching an operation channel of the actuated access point into the better channel having a relatively lower weighted RSSI value for improving the overall efficiency of the wireless network system. Furthermore, the method for automatically allocating channels can be used to periodically monitor the channel status of the channel corresponding to each of the access points, so as to actively fine-adjust the channel of that access point or to change a monitor period.

In a preferred embodiment, the weighted RSSI value of each of the channels is calculated by the following equation:

$$\text{Weighted\_RSSI} = \text{current\_channel\_RSSI} \times 4 + (\text{current\_channel} \pm 1\_\text{RSSI} \times 2) + (\text{current\_channel} \pm 2\_\text{RSSI} \times 1);$$

wherein the current_channel_RSSI is the accumulated RSSI value of each channel; the current_channel±1_RSSI is respectively the accumulated RSSI value of a first last channel and a first next channel near by each channel; and the current_channel±2_RSSI is respectively the accumulated RSSI value of a second last channel and a second next channel near by each channel.

In a preferred embodiment, the device for automatically allocating channels of a wireless network system in accordance with the present invention is provided with at least one access point and comprises:

a wireless network module for connecting to the at least one access point via a wireless network;

an information collecting module for collecting at least one channel status information of the at least one access point;

a parameter database for storing at least one predetermined operation setting value; and a calculation module for calculating which one of channels is a better channel according to the collected channel status information and the parameter database, so as to control that access point to switch an operation channel into the better channel.

Preferably, the access point further comprises:

a wireless network module for connecting to the device and other access points via the wireless network;

an information collecting module for scanning all available channels to collect the channel status, information of the available channels corresponding to the other access points;

an information report module for reporting the channel status information corresponding to said access point to the other access points, and reporting the channel status information collected by said access point to the device; and an adjustment module for switching the operation channel of said access point into the better channel according to a control signal from the device.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 4 is a table showing channel status information of the method for automatically allocating channels of the wireless network system according to the first and second preferred embodiments of the present invention during calculating the better channel;

FIG. 5 is a table showing accumulated Received Signal Strength Incident (RSSI) of the method for automatically allocating channels of the wireless network system according to the first and second preferred embodiments of the present invention during calculating the better channel;

FIG. 6 is a table showing weighted_RSSI of the method for automatically allocating channels of the wireless network system according to the first and second preferred embodiments of the present invention during calculating the better channel.

DETAILED DESCRIPTION

Figure 1:
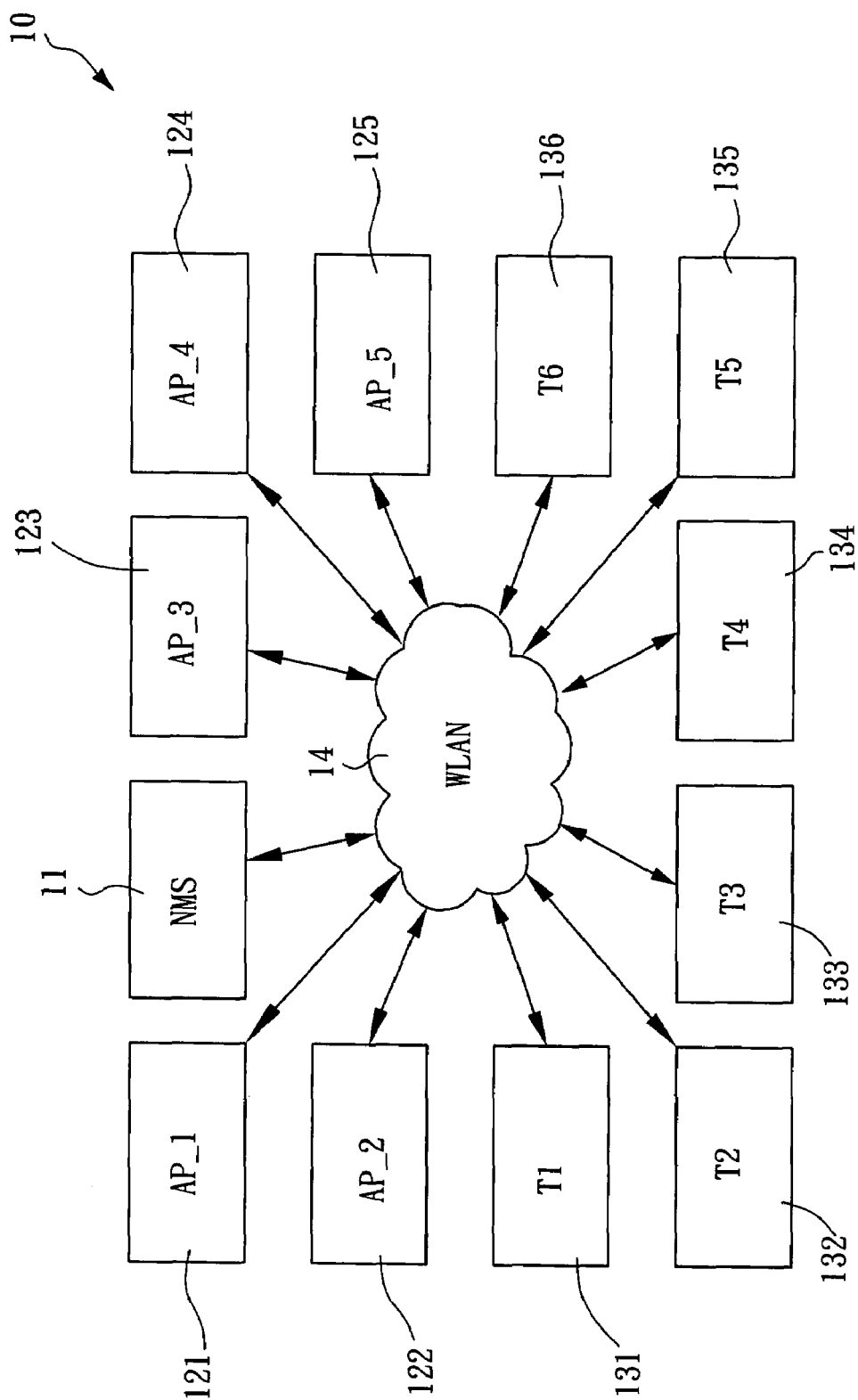
FIG. 1 is a block diagram of a wireless network system according to a preferred embodiment of the present invention.

Referring now to FIGS. 1, a block diagram of a wireless network system 10 according to a preferred embodiment of the present invention is illustrated. As shown, the wireless network system 10 comprises at least one Network Management Server 11 (also called NMS hereinafter), at least one Access Point 121-125 (i.e. AP_1-AP_5), and at least one terminal device 131-136 (i.e. T1-T6). The NMS 11, the access points 121-125, and the terminal devices 131-136 are interconnected to each other via a wireless network environment 14, such as a system selected from (but not limited to): Wireless Local Access Network (WLAN), Global System for Mobile Communication (GSM), General Packet Radio Service (GPRS), Code Division Multiple Access (CDMA), Ultra Wide Band (UWB), and etc. The NMS 11 is mainly used to manage and monitor an operation status corresponding to each of the access points 121-125 in the wireless network system 10. The access points 121-125 are used to receive connection requests and information transmission requests from the terminal devices 131-136, and then execute corresponding information transmissions. The terminal devices 131-136 are devices for general users to access an Internet, and can be selected from (but not limited to): computers, Personal Digital Assistants (PDAs), mobile phones or game players with a network access function, or other electronic information devices with a built-in wireless network receiver or an extended wireless network receiver.

Referring still to FIG. 1, in the preferred embodiment of the present invention, a device for automatically allocating channels can be selected from an independent wireless network device (not shown) in a hardware form linked to the wireless network environment 14, or in a software form built in the NMS 11, one of the access points 121-125, or one of the terminal devices 131-136.

Figure 2:
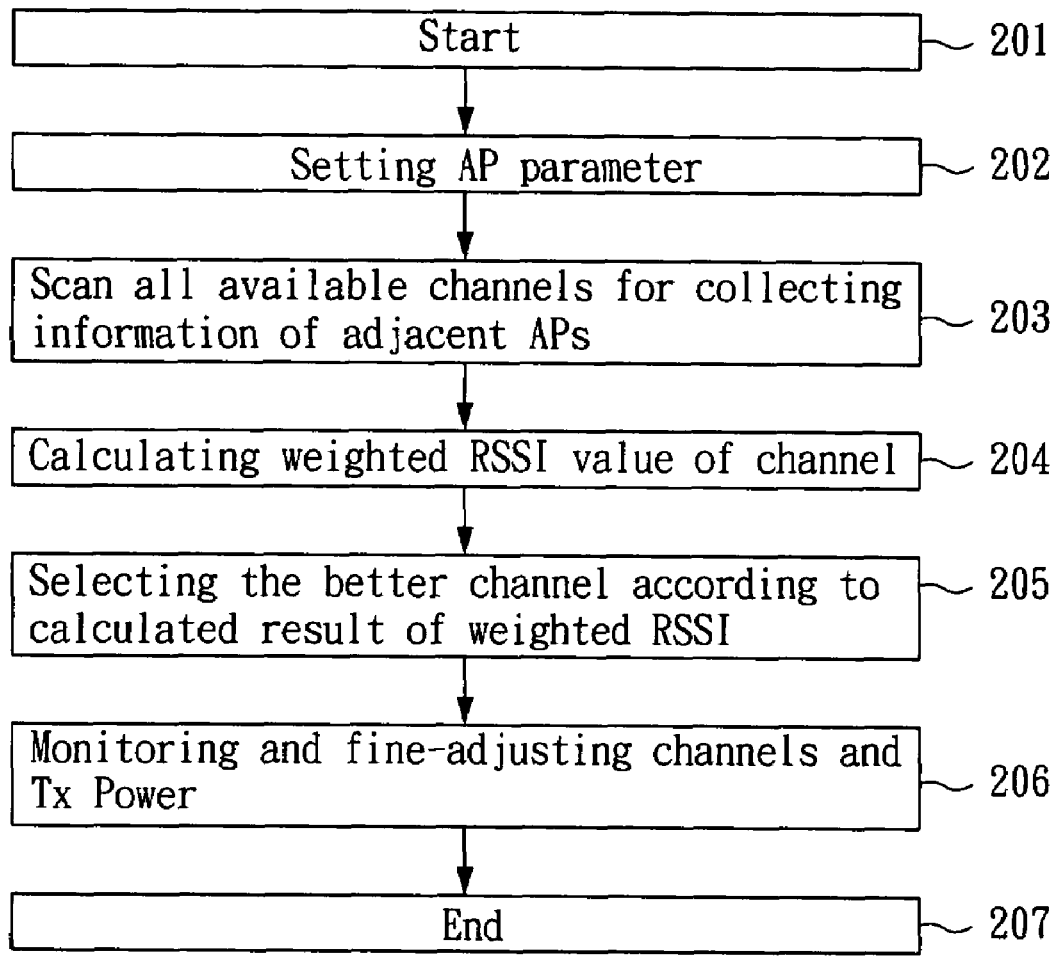
FIG. 2 is a flowchart of a method for automatically allocating channels of the wireless network system according to a first preferred embodiment of the present invention.

Referring now to FIG. 2, a flowchart of a method for automatically allocating channels of the wireless network system according to a first preferred embodiment of the present invention is illustrated. As shown, the method comprises the following steps:

In step 201 of start, turning on the device for automatically allocating channels in order to execute the method for automatically allocating channels.

In step 202, executing an initialization procedure via the device for automatically allocating channels according to at least one predetermined parameter of the device, and then controlling an operation of one of the access points according to a setting content of the predetermined parameter. In the preferred embodiment of the present invention, the predetermined parameter preferably comprises various control parameters for managing and monitoring the other of the access points, various calculation parameters for calculating the better channel as described more detailed hereinafter, various setting parameters for setting the operation of the device for automatically allocating channels, and etc.

In step 203, actuating one of the access points in the wireless network system to scan all available channels for collecting channel status information of the other of the access points corresponding to said channels by the device for automatically allocating channels, wherein the other of the access points is at least one access point in a coverage region covered by wireless signals of the actuated access point (i.e. at least one access point capable of directly connecting to the actuated access point and transmitting information to each other). Furthermore, in the preferred embodiment of the present invention, the channel status information preferably comprises MAC addresses of the access points, channel numerals of channels used by the access points, and current Received Signal Strength Incidents (RSSI) of the access points.

In step 204, calculating a weighted RSSI value of each of the channels via the device for automatically allocating channels according to the channel status information and the parameter content collected by the device, wherein the weighted RSSI value is substantially corresponding to a load status or a congestion status of each of the channels, if the weighted RSSI value of one of the channels increases, it means that the channel becomes more congested and easier to cause an interference phenomenon or a reduction of transmission efficiency. How to calculate the weighted RSSI value will be described more detailed hereinafter by the following preferred embodiment of the present invention.

In step 205, selecting one of the channels having a relatively lower weighted RSSI as the better channel which is used dominantly by said access point via the device for automatically allocating channels according to a calculated result of the weighted RSSI corresponding to each of the channels; and then transmitting a control signal to the actuated access point for switching the operation channel into the better channel for the purpose of improving the overall efficiency of the wireless network system and lowering the interference phenomenon.

In step 206, continuously monitoring and fine-adjusting the channel status and a transmission power (Tx Power) of each of the access points in the wireless network system via the device for automatically allocating channels in a periodically (and automatically) manner (or via a control operation of a network administrator) according to the setting content of the parameters. In other words, in the preferred embodiment of the present invention, the device for automatically allocating channels is used to periodically and continuously monitoring a wireless network quality of the channel corresponding to (i.e. used at present by) each of the access points. Then, periodically (such as every second or every several seconds) monitoring to sample all of the RSSI values of the channel (i.e. the operation channel) corresponding to one of the access points in a monitoring period (such as ten seconds or several tens seconds), and checking if an average value of all of the RSSI values (i.e. the average RSSI value in the monitoring period) is greater than a predetermined setting value (such as 25). If yes, re-executing the method for automatically allocating channels of the present invention so as to re-adjust and select the better channel for said access point to use. Meanwhile, duplicating/prolonging the monitoring period, i.e. duplicating the sampling times when monitoring. If the next average RSSI value in the next monitoring period is still greater than the predetermined setting value, re-allocating another better channel, and further duplicating the next monitoring period. In other words, executing a reinforced monitoring to the channel of said access point, and finally adjusting the monitoring frequency to an original setting value until the average RSSI value of said access point is lower than the predetermined setting value.

In step 207, finishing the method for automatically allocating channels of the present invention.

Figure 3:
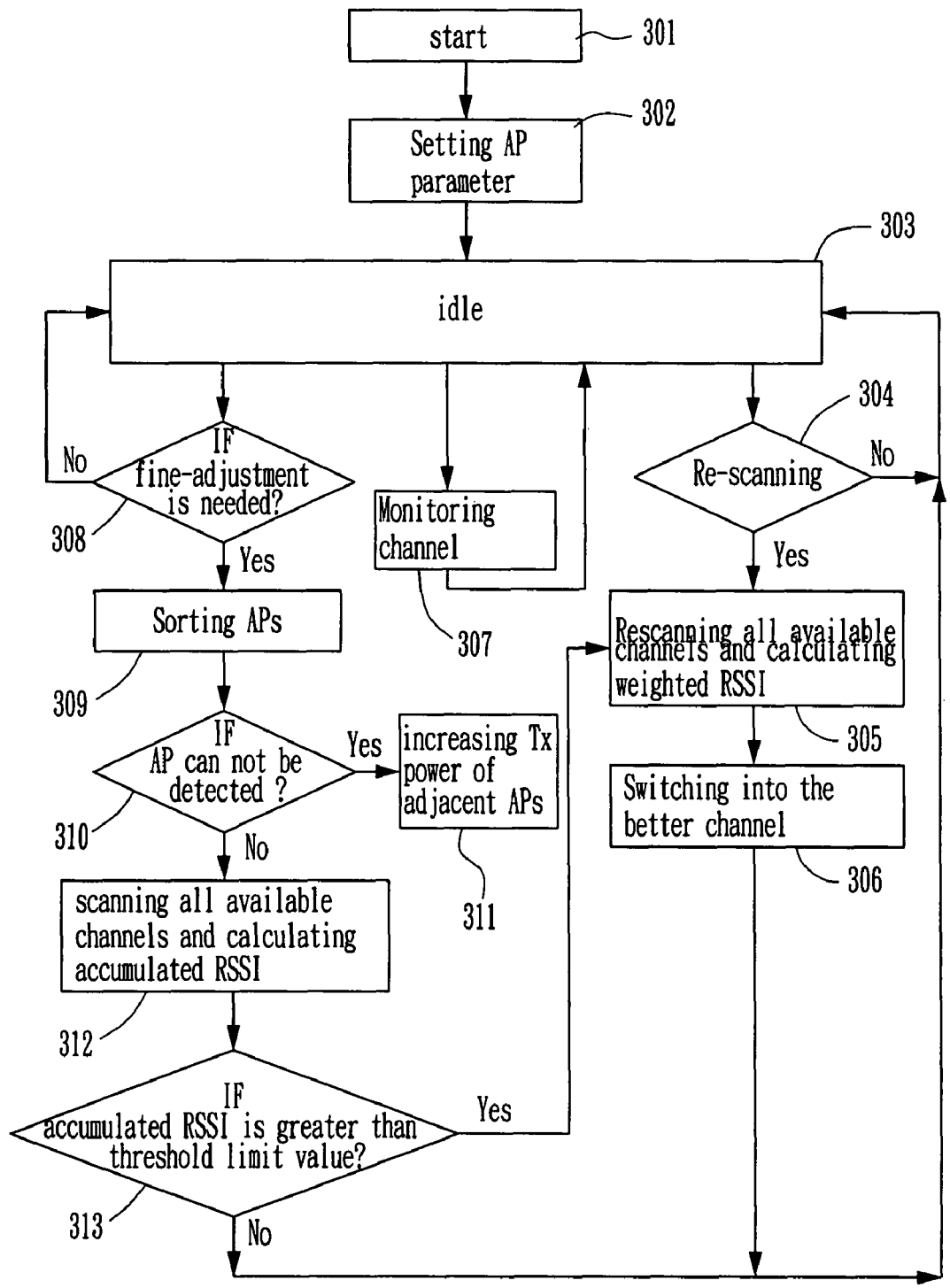
FIG. 3 is a flowchart of a method for automatically allocating channels of the wireless network system according to a second preferred embodiment of the present invention.

Referring to FIG. 3, a flowchart of a method for automatically allocating channels of the wireless network system according to a second preferred embodiment of the present invention is illustrated. As shown, the method comprises the following steps:

In step 301 of start, turning on the device for automatically allocating channels in order to execute the method for automatically allocating channels.

In step 302, executing an initialization procedure via the device for automatically allocating channels according to at least one predetermined parameter of the device, and then controlling an operation of one of the access points according to a setting content of the predetermined parameter.

In step 303, switching the device for automatically allocating channels into an idle status, wherein the device in the idle status can be used to execute the following steps under the manual control of a network administrator. Alternatively, setting the device for automatically allocating channels according to the parameters preset in the device to automatically execute the following steps in a predetermined time point (such as a certain time point per day), in a predetermined period (such as per two hours), or in a predetermined occurrence (such as when increasing or removing at least one of the access points).

In step 304, checking if any command for re-scanning to execute the method for automatically allocating channels of the present invention is received, wherein the command can be a command manually or automatically generated for the device. If yes, go to step 305; if not, go back to the idle status of the step 303.

In step 305, pausing any connection and any information transmission of all of the terminal devices in the wireless network system, and actuating one of the access points to scan all available channels via the device for automatically allocating channels. Then, calculating a weighted RSSI and determining which one is the better channel according the channel status information scanned by said access point. The step 305 is mentioned and described more detailed in the steps 203, 204, and 205 of FIG. 2.

In step 306, controlling the actuated access point to switch the operation channel thereof into the calculated better channel via the device for automatically allocating channels. Then, go back to the idle status of the step 303.

In step 307, monitoring the channel status of each of the access points in the wireless network system in a suitable manner, such as in a predetermined time point, in a predetermined period, in a manually operated manner, or in a predetermined occurrence, via the device for automatically allocating channels according to a setting content of the predetermined parameter. Furthermore, during monitoring the channel status of the access points and the quality thereof by the method for automatically allocating channels of the present invention, further adjusting a mode for monitoring according to checking if an average RSSI value is greater than a predetermined setting value, which is mentioned and described more detailed in the step 206 and thus omitted hereinafter.

In step 308, when finding that it is necessary to fine-adjust the Tx power or the operation channel of one or some of the access points in the step 307, go to step 309.

In step 309, actuating one of the access points to detect the other of the access points via the device for automatically allocating channels, and then sorting all of the access points according to information transmission load of the access points (from the higher to the lower).

In step 310, if a signal of one of the access points can not be detected, go to step 311 of power fine-adjusting procedure in order to increase the Tx power of at least one other of the access points near by a region where said undetected access point is located, so as to compensate a wireless signal strength in the region.

In step 312, actuating each of the access points in turn according to the sorted order via the device for automatically allocating channels, so as to scan all available channels for obtaining channel status information of the other of the access points, and then calculating an accumulated RSSI value of the current operation channel corresponding to each of the access points.

In step 313, checking if the accumulated RSSI value corresponding to each of the access points is greater than a predetermined threshold limit value, wherein if yes, executing a channel fine-adjusting procedure for said access point, i.e. executing the method for automatically allocating channels in the steps 305 and 306 in order to re-allocate the better channel to said access point.

Referring now to FIGS. 4, 5, and 6, three tables respectively showing channel status information, accumulated Received Signal Strength Incident (RSSI), and weighted_RSSI of the method for automatically allocating channels of the wireless network system according to the first and second preferred embodiments of the present invention during calculating the better channel are illustrated in order to describe the operation process for calculating the better channel more detailed hereinafter.

Firstly, if one of the access points is actuated to finish scanning all available channels according to the present invention, a channel status information of the other of the access points near by said access point will be obtained, as shown in the table of FIG. 4. As shown in the table of FIG. 4, it means that four of the access points within a coverage region covered by wireless signals of the actuated access point are respectively using the 11th, 10th, 11th, and 3rd channels at present, while the RSSI values of the channels of the four access points are respectively 17, 16, 8, and 22. Furthermore, assuming the RSSI values of the other channels are 0 (not shown).

Then, adding the RSSI values corresponding to the same channel, so as to obtain the accumulated RSSI value of each of the channels as shown in the table of FIG. 5, wherein the accumulated RSSI value of the 11th channel, the 10th channel, and the 3rd channel are respectively 25, 16, 22. Furthermore, the accumulated RSSI values of the other channels are 0 (not shown).

After this, further calculating the weighted RSSI value of each of the channels. The accumulated RSSI value (i.e. current_channel_RSSI) of any one of the channels is weighted by a predetermined weighted multiple, such as 4-times, to calculate the corresponding weighted RSSI value thereof. Meanwhile, the first previous channel and the first next channel near by said channel respectively have an accumulated RSSI value (i.e. current_channel±1_RSSI) weighted by a relatively smaller predetermined weighted multiple, such as 2-times, to calculate the corresponding weighted RSSI value thereof which will be added into the total weighted RSSI value of said channel. In a similar manner, the second previous channel and the second next channel near by said channel respectively have an accumulated RSSI value (i.e. current_channel±2_RSSI) weighted by a further smaller predetermined weighted multiple, such as one, to calculate the corresponding weighted RSSI value thereof which will be added into the total weighted RSSI value of said channel. Thus, the total weighted RSSI value of said channel can be obtained as shown in the table of FIG. 6. The weighted RSSI value can be calculated according to the following equation:

$$Weighted\_RSSI = current\_channel\_RSSI \times 4 + (current\_channel \pm 1\_RSSI \times 2) + (current\_channel \pm 2\_RSSI \times 1)$$

Wherein the current_channel_RSSI is the accumulated RSSI value of each of the channels; the current_channel±1_RSSI is respectively the accumulated RSSI value of the first previous channel and the first next channel near by each of the channels; and the current_channel±2_RSSI is respectively the accumulated RSSI value of the second previous channel and the second next channel near by each of the channels.

It should be noted that the equation and the weighted multiple as described above is only a preferred embodiment of the present invention, but not a limitation. The network administrator can vary the parameters as described above to suitably adjust the equation and the weighted multiple in response to different operation needs. For example, the weighted multiple of the accumulated RSSI value of the first previous channel and the first next channel (i.e. the current_channel±1_RSSI) can be changed from 2-folds to 3-folds for highlighting a particular need of preventing from any interference between adjacent channels. Alternatively, the equation can be changed to delete the influence of the accumulated RSSI value of the second previous channel and the second next channel (i.e. the current_channel±2_RSSI), and so forth. Moreover, as shown in the equation, the weighted RSSI value is substantially corresponding to a load status or a congestion status of each of the channels. If the weighted RSSI of one of the channels increases, it means that said channel becomes more congested and easier to cause an interference phenomenon or a reduction of transmission efficiency. In other words, as shown in the table of FIG. 6, for example, because the weighted RSSI values of the 6th and 7th channels are relatively lower (i.e. the weighted RSSI values are 0), the 6th channel or the 7th channel will be assigned as the better channel according to the method for automatically allocating channels of the present invention, while the actuated access point will be controlled to switch into the better channel.

Referring back to FIG. 3, in one preferred embodiment of the present invention, the threshold limit value (or a threshold limit condition) as described in the step 313 can be supposed as a channel fine-adjusting procedure for said access point, wherein when the accumulated RSSI value corresponding to the current operation channel of said access point is greater than 50, the channel fine-adjusting procedure for said access point will be executed. For instance, as shown in FIG. 5, the highest accumulated RSSI value of all of the access points is only 25, so that there is still no need to automatically re-allocate the better channel.

Figure 7:
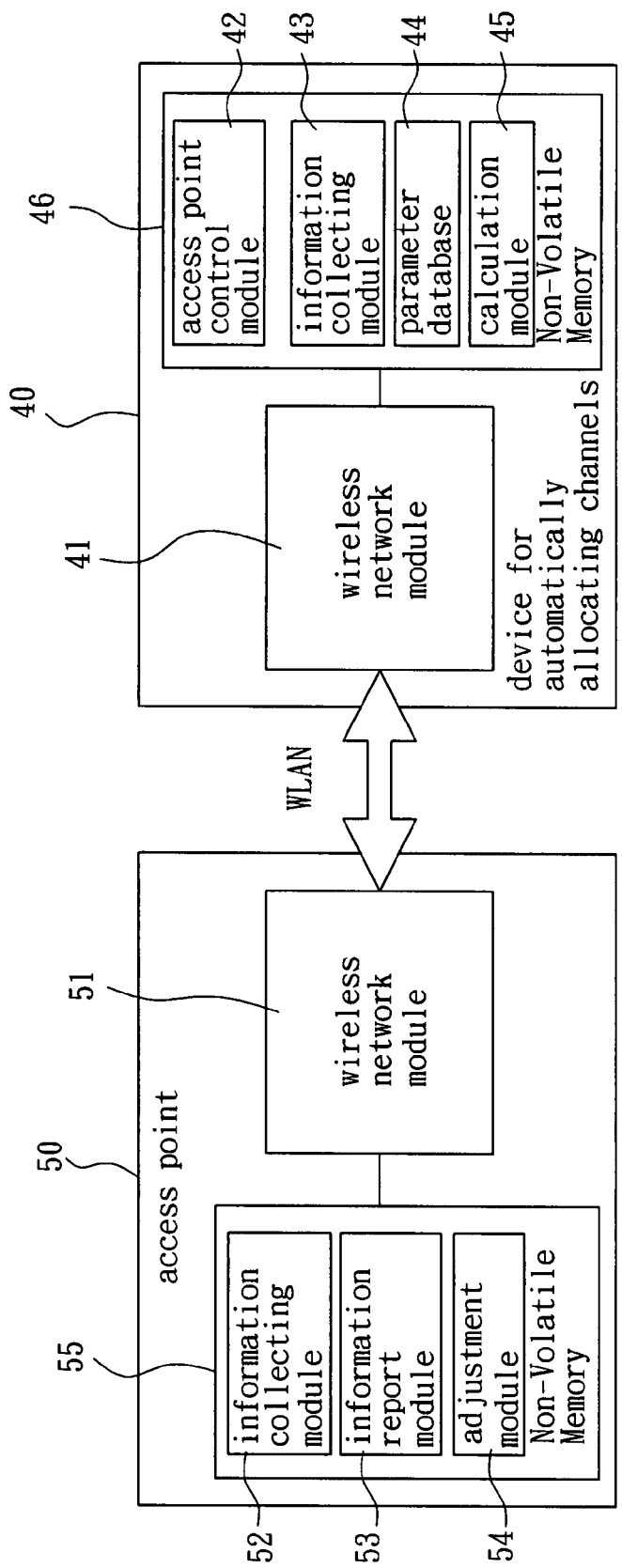
FIG. 7 is a block diagram of a device for automatically allocating channels of the wireless network system and one of Access Points (APs) according to the preferred embodiment of the present invention.

Referring now to FIG. 7, a block diagram of a device for automatically allocating channels of the wireless network system and at least one Access Point (AP) according to the preferred embodiment of the present invention are illustrated. As shown, the device designated by numeral 40 further comprises a wireless network module 41, an access point control module 42, an information collecting module 43, a parameter database 44, and a calculation module 45. In the preferred embodiment of the present invention, the device 40 for automatically allocating channels can be selected from an independent hardware device linked to the other of access points 50 (APs) or a network management server (NMS) via the Wireless Local Access Network (WLAN). Alternatively, the device 40 for automatically allocating channels can also be in a software form built in a memory of one of the access points 50 or that of the NMS.

Referring still to FIG. 7, the wireless network module 41 provides a function for the device 40 for automatically allocating channels to link to a wireless network, such as the WLAN, and then connect to each of the access points 50 in the wireless network. Due to the wireless network module 41 can be optionally varied by the person skilled in the art based on related traditional technologies applied to traditional wireless network devices without departing from the scope and the spirit of the present invention, the detailed description thereof will be omitted hereinafter. The access point control module 42 is used to send a control signal to the other of the access points 50 for actuating one of the access points 50 to scan all available channels, collect the channel status information, switch the operation channel, or report the current channel status. The information collecting module 43 is used to collect the channel status information scanned and collected by the actuated access point 50. The parameter database 44 is stored with at least one predetermined operation setting value for executing the following calculation procedure, or for periodically monitoring at least one parameter setting value of each of the access points 50, and etc. The calculation module 45 is used to calculate which one is the better channel according to the collected channel status information and the parameter database 44, so as to control said access point 50 to switch a current operation channel into the better channel. In the preferred embodiment of the present invention, the access point control module 42, the information collecting module 43, the parameter database 44, and the calculation module 45 may be in a software form selectively stored in a Non-Volatile Memory (NVM) 46, such as (but not limited to): a hard disk, a flash memory, or a Programmable Read-Only Memory (PROM).

Referring still to FIG. 7, each of the access points 50 further comprises a wireless network module 51, an information collecting module 52, an information report module 53, and an adjustment module 54. The wireless network module 51 provides a function for connecting to the device 40 for automatically allocating channels, the other of the access points 50, and other terminal devices (not shown) via the wireless network, such as the WLAN. The information collecting module 52 is used to scan all available channels, and collect the channel status information of the available channels corresponding to the other of the access points 50. The information report module 53 is used to report the current channel status information corresponding to one of the access points 50 to the other of the access points 50, and report the channel status information collected by said access point 50 to the device 40 for automatically allocating channels. The adjustment module 54 is used to switch the operation channel of said access point 50 into the better channel according to the control signal from the device 40 for automatically allocating channels. Similarly, the information collecting module 52, the information report module 53, and the adjustment module 54 may be in a software form selectively stored in a Non-Volatile Memory (NVM) 55, such as a hard disk, a flash memory, or a Programmable Read-Only Memory (PROM), without limitation.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A method for automatically allocating channels of a wireless network system, comprising:
actuating one of access points in a wireless network system to scan all available channels for collecting channel status information of the other of the access points corresponding to said channels;
calculating a better channel according to the collected channel status information; and
switching an operation channel of the actuated access point into the better channel;
wherein said other of the access points are access points in a coverage region covered by wireless signals of the actuated access point, and the channel status information comprises a MAC address of each of the access points, a channel numerals of each of said channels, and a Received Signal Strength Incidents (RSSI) of each of the access points,
wherein the step of calculating the better channel further comprises:
calculating an accumulated RSSI value of each of said channels according to the collected channel numerals and the RSSI value thereof; and
calculating a weighted RSSI value of each of said channels according to the accumulated RSSI value thereof, wherein one of said channels having a relatively lower weighted RSSI value is assigned as the better channel; and
wherein the weighted RSSI value of each of said channels is calculated by the following equation:

$$\text{Weighted RSSI} = \text{current channel RSSI} \times 4 + (\text{current channel} \pm 1 \text{ RSSI} \times 2) + (\text{current channel} \pm 2 \text{ RSSI} \times 1);$$

with the current channel RSSI is the accumulated RSSI value of each of said channels; the current channel±1 RSSI is respectively the accumulated RSSI value of a first last channel and a first next channel near by each of said channels; and the current channel±2 RSSI is respectively the accumulated RSSI value of a second last channel and a second next channel near by each of said channels.

2. The method for automatically allocating channels of the wireless network system of claim 1, further comprising a procedure of periodically monitoring the channel status information of each of the access points, wherein when an average value of all of the RSSI values in a monitoring period for monitoring the operation channel of said access point is greater than a predetermined setting value, re-executing the method for automatically allocating channels and duplicating the monitoring period.

3. The method for automatically allocating channels of the wireless network system of claim 1, further comprising a power fine-adjusting procedure for one of the access points, wherein the power fine-adjusting procedure comprises:
starting the power fine-adjusting procedure;
sorting all of the access points; and
if a signal of one of the access points being undetected, increasing a transmission power of at least one other of the access points near by said undetected access point.

4. The method for automatically allocating channels of the wireless network system of claim 1, further comprising a channel fine-adjusting procedure for one of the access points, wherein the channel fine-adjusting procedure comprises:
starting the channel fine-adjusting procedure;
sorting all of the access points; and
actuating each of the access points in turn to scan all of the available channels for calculating an accumulated RSSI value of each of the access points;
wherein if the accumulated RSSI value corresponding to each of the access points is greater than a predetermined threshold limit value, re-executing the method for automatically allocating channels to re-allocate the better channel to that access point.

5. The method for automatically allocating channels of the wireless network system of claim 4, wherein the step of sorting all of the access points is sorted from the higher to the lower according to an information transmission load of each of the access points.

6. A device for automatically allocating channels of a wireless network system which is provided with at least one access point, the device comprising:
   a wireless network module for connecting to the at least one access point via a wireless network;
   an information collecting module for collecting at least one channel status information of the at least one access point;
   a parameter database for storing at least one predetermined operation setting value; and
   a calculation module for calculating which one of channels is a better channel according to the collected channel status information and the parameter database, so as to control that access point to switch an operation channel into the better channel;
   wherein the channel status information comprises a channel numeral of the at least one access point and a Received Signal Strength Incidents (RSSI) thereof;
   wherein the step of calculating the better channel further comprises:
      calculating an accumulated RSSI value of each of said channels according to the collected channel numerals and the RSSI value thereof; and
      calculating a weighted RSSI value of each of said channels according to the accumulated RSSI value thereof, wherein one of said channels having a relatively lower weighted RSSI value is assigned as the better channel; and
   wherein the weighted RSSI value of each of said channels is calculated by the following equation:

Weighted RSSI=current channel RSSI×4+(current channel±1 RSSI×2) +(current channel±2 RSSI× 1);

wherein the current channel RSSI is the accumulated RSSI value of each of said channels; the current channel±1 RSSI is respectively the accumulated RSSI value of a first last channel and a first next channel near by each of said channels; and the current channel±2 RSSI is respectively the accumulated RSSI value of a second last channel and a second next channel near by each of said channels.

7. The device for automatically allocating channels of the wireless network system of claim 6, wherein the wireless network system is a Wireless Local Access Network (WLAN), and the device is selected from one of a Network Management Server (NMS) and an access point.

8. The device for automatically allocating channels of the wireless network system of claim 6, wherein the access point further comprises:
   a wireless network module for connecting to the device and other access points via the wireless network;
   an information collecting module for scanning all available channels to collect the channel status information of the available channels corresponding to the other access points;
   an information report module for reporting the channel status information corresponding to said access point to the other access points, and reporting the channel status information collected by said access point to the device; and
   an adjustment module for switching the operation channel of said access point into the better channel according to a control signal from the device.

9. A method for automatically allocating channels of a wireless network system which is provided with a plurality of access points connected to each other via a wireless network, the method comprising:
   actuating one of the access points to scan all available channels for collecting the channel status information of available channels corresponding to other access points;
   calculating an accumulated RSSI value of an operation channel corresponding to the actuated access point according to the collected channel status information; and
   if the accumulated RSSI value of the actuated access point being greater than a predetermined threshold limit value, executing a step of:
   calculating a weighted RSSI value of each of the channels according to the collected channel status information so as to switch the operation channel of the actuated access point into a better channel having a relatively lower weighted RSSI;
   wherein said other of the access points are access points in a coverage region covered by wireless signals of the actuated access point, and the channel status information comprises a MAC address of each of the access points, a channel numerals of each of said channels, and a Received Signal Strength Incidents (RSSI) of each of the access points; and
   wherein the weighted RSSI value of each of said channels is calculated by the following equation:

Weighted $RSSI$=current channel $RSSI$×4+(current channel±1 $RSSI$×2)+(current channel±2 $RSSI$×1);

wherein the current channel RSSI is the accumulated RSSI value of each of said channels; the current channel±1 RSSI is respectively the accumulated RSSI value of a first last channel and a first next channel near by each of said channels; and the current channel±2 RSSI is respectively the accumulated RSSI value of a second last channel and a second next channel near by each of said channels.

* * * * *